United States Patent
Wallace et al.

[15] 3,636,521
[45] Jan. 18, 1972

[54] PROGRAMMING SYSTEM

[72] Inventors: Harry L. Wallace, Garden City; Richard M. Williams, Livonia, both of Mich.

[73] Assignee: Burroughs Corporation, Detroit, Mich.

[22] Filed: Aug. 21, 1970

[21] Appl. No.: 65,763

[52] U.S. Cl. ....................340/172.5
[51] Int. Cl. ....................G06c 21/04, G06f 9/04
[58] Field of Search ....................340/172.5; 235/61.6

[56] References Cited

UNITED STATES PATENTS

| | | | |
|---|---|---|---|
| 2,757,864 | 8/1956 | Pollard et al. | 235/61.6 |
| 2,883,106 | 4/1959 | Cornwell et al. | 235/61.6 |
| 2,891,237 | 6/1959 | Sink et al. | 340/174 |
| 2,991,453 | 7/1961 | Leonard | 340/172.5 |
| 2,996,699 | 8/1961 | Kramskoy | 340/172.5 |
| 3,056,111 | 9/1962 | Finkler et al. | 340/172.5 |
| 3,069,659 | 12/1962 | Skovmand et al. | 340/172.5 |
| 3,080,548 | 3/1963 | Hagen et al. | 340/172.5 |
| 3,349,376 | 10/1967 | Bouvier | 340/172.5 |
| 3,448,436 | 6/1969 | Machol, Jr. | 340/172.5 |
| 3,495,222 | 2/1970 | Perotto et al. | 340/172.5 |

*Primary Examiner*—Gareth D. Shaw
*Assistant Examiner*—Jan E. Rhoads
*Attorney*—Kenneth L. Miller and Edwin W. Uren

[57] ABSTRACT

A system for selecting and entering a program into the memory of an electronic digital computer in which one of a plurality of programs is selectable from a keyboard. Program routines that individually correspond to a particular key on the keyboard are contained as binary information on sectors of a cyclically read medium. The information on the medium corresponding to the selected key is entered into the computer memory and stored as a program.

14 Claims, 9 Drawing Figures

INVENTORS.
RICHARD M. WILLIAMS.
HARRY L. WALLACE.
BY
Edwin Wilson
AGENT.

PROGRAMMING SYSTEM

BACKGROUND OF THE INVENTION

In the programming of electronic digital computers and especially in the programming of relatively small business computers it is desirable that the programming function be relatively simple. This requirement enables an operator to utilize the computer efficiently without extensive training. A programming system commonly used in small business computers combines, among other components, a keyboard having a plurality of program keys and a read-only memory such as a diode matrix containing a plurality of machine instruction. In the operation of such a computer, each one of the program keys represents a predetermined combination of machine instructions that collectively comprise a program or program routine, and by the depression of a particular program key a program or program routine is selected from the read-only memory and entered into program memory. As mentioned, such a memory may be a diode matrix which is formed by the first set of parallel key-coupled wires, each electrically and switchably connected with a program key, and a second set of parallel instruction wires crossing normally to the first set of key-coupled wires. Each instruction wire represents only one instruction of the computer's repertoire. By connecting a diode across the intersection of a key-coupled wire and an instruction wire an electrical signal generated by the depression of a key will cause an electrical signal on the diode-connected instruction wire. Any combination of instruction wires can be diode-connected to any key-coupled wire to achieve a desired combination of machine instructions represented by a particular program key.

Once the interconnecting diodes of the diode matrix are soldered into place, the programming capability of the machine is established and is not easily altered. Alteration entails hand soldering in a complexly wired circuit to remove and reconnect diodes. This type of operation obviously requires time-consuming and tedious labor. Thus, the ability of such a computer to change its programming capabilities is severely limited by the relative inalterability of the diode matrix.

SUMMARY OF THE INVENTION

It is a primary object of the present invention to provide means whereby an operator can easily change the programming capability of an electronic digital computer by effecting convenient alteration in its read-only memory.

It is another object of the invention to permit changes in a read-only memory to be made with a minimum expenditure of time and effort.

The invention fulfills these and other objectives by replacing the practically inalterable diode matrix-type of read-only memory of such computers with the combination of an easily alterable program medium, means for cyclically reading the medium, code-selecting means, code-assigning means, comparator means, and a switching network. In this combination the code selecting means provides a plurality of selectable codes corresponding to discrete information sectors on the program medium. As the medium is cyclically read by the reader a predetermined code is assigned to each sector of information on the program medium. Each assignable code has a related selectable code. The selected code and the cyclically changing assigned code are compared for a predetermined relationship. When the comparator recognizes the predetermined relationship the information sector of the program medium relating to the compared, assigned code is switched into a memory of the digital computer and stored as a program.

DESCRIPTION OF THE PREFERRED EMBODIMENT

Figure 1:
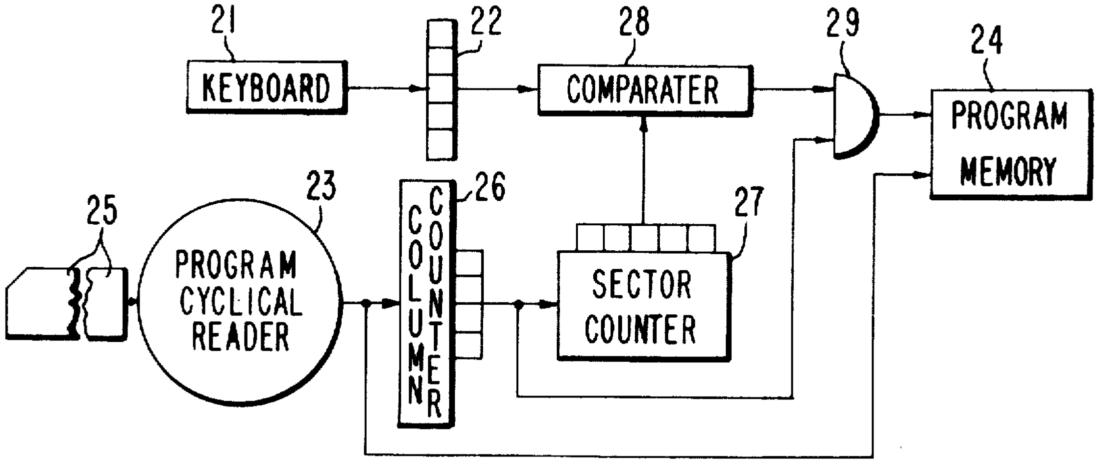
FIG. 1 is a block diagram illustrating a preferred programming system configuration.

In order to facilitate a more complete understanding of the invention a specific example or preferred embodiment will hereinafter be described in conjunction with the drawings. Referring to the figures by characters of reference there is illustrated in FIG. 1 the preferred embodiment of the programming system having a code-selecting means or keyboard 21 coupled to a selector register 22 to store the code selected and generated by a depression of a key on the keyboard. The code selected by the depression of a key represents a program routine that is read from a medium, such as a card, in a medium cyclical reader or card reader 23 into a program memory 24. In the preferred embodiment one relatively small field or sector of a program card 25 stores the required binary programming information corresponding to one of the keys on the keyboard 21. It is necessary, therefore, to provide means by which only that sector of the card corresponding to the depressed key is read into computer memory 24. This is accomplished by assigning predetermined sectors of the program card to corresponding keys on the keyboard 21.

Figures 2, 4:
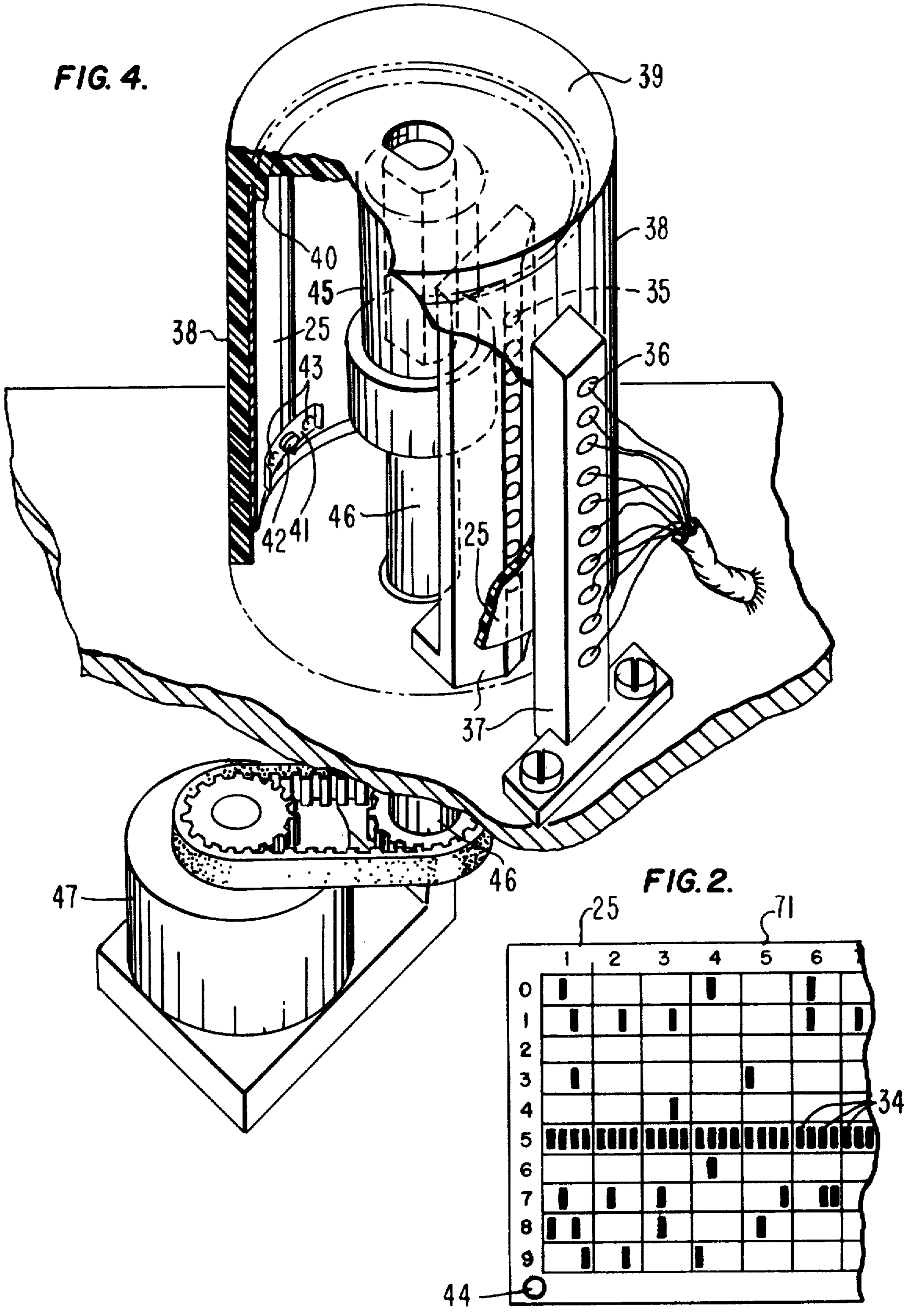
FIG. 2 is a fragmentary illustration of a program card.
FIG. 4 is a perspective view partly in section of a cyclical reader for the program card.

In the preferred configuration, for example, an 80-column card 25 is divided into 20 equal sectors of four columns each, as illustrated in FIG. 2. There are 20 selectable program keys on the keyboard also coded from one to 20. A code-assigning means comprising a card column counter 26 (FIG. 1) that cyclically counts four contiguous columns in each of the 20 sectors of the program card 25 and a sector counter 27 responsive to each fourth count of the column counter assigns a code to each four-column sector of the card as it is cyclically read.

The code generated by the depressed key and stored in the selector register 22 is compared by a comparator 28 with the assigned sector code of the card counter 27 to detect a predetermined corresponding relationship. The comparator 28 generates a LOAD signal when the code assigned by the sector counter 27 attains the corresponding relationship with the code stored in the selector register 22. The LOAD signal is gated through logic circuitry 29 with column count signals from the card column counter 26 to enable a computer memory 24 to accept and store the program contained on the sector of the program card 25 corresponding to the selected program key.

Within the system the keyboard 21 functions to generate a five-place binary code upon the depression of a selected key. There are several well-known mechanisms for carrying out this function, but one straightforward approach is to link each key to five switches, whereby the depression of a key actuates a different permutation of switches to generate a five-place binary code.

Figure 3:
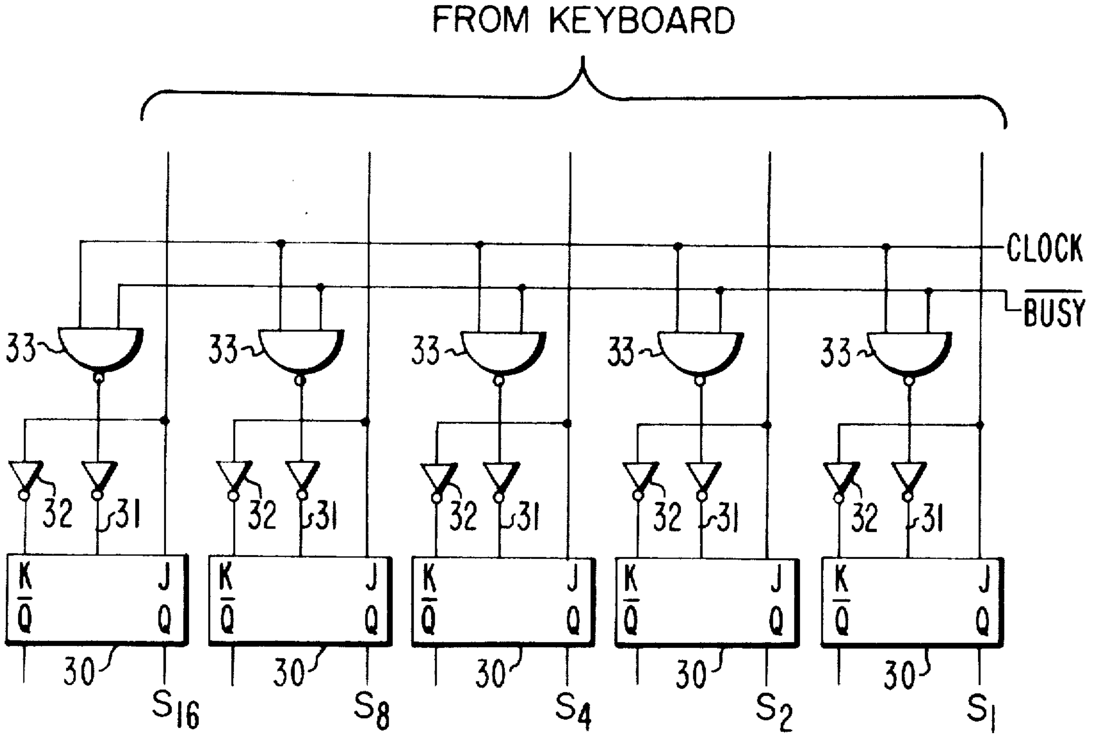
FIG. 3 is a schematic diagram of a register for storing an electronic code generated by a code-selecting means.

Electrically connected to the keyboard is a selector register 22 serving to store the binary code selected and generated by a depression of a selected key. As an example of a binary storage means, a flip-flop register, such as that shown in FIG. 3, is used in the preferred configuration. The states of five flip-flops 30 in the register 22 represent in binary format the digits 1, 2, 4, 8 and 16, respectively. For example, the depression of a key labeled "ADCR" turns on the flip-flops representing binary 1 and 4 whereas the depression of a program key labeled "DEBIT" turns on flip-flops representing digits 1 and 2. A turned-on flip-flop is defined as a flip-flop in which a Q state of the flip-flop is at a first or "true" voltage level and the $\overline{Q}$ state is at a second or "false" voltage level. J–flip-flops are used in the selector register that have the common switching characteristics of their genre, i.e., an electrical pulse at the clock input 31 of the flip-flop changes its state from Q to $\overline{Q}$ if the K input has a "true" voltage level or from $\overline{Q}$ to Q if the K input is at a "false" level. The switches associated with the program keys on the keyboard are electrically connected to the J inputs of associated flip-flops in the selector register. An inverter 32 electrically connected between the J input and the K input of each flip-flop insures that the J and K states are always of opposite polarity. If no key on the keyboard is depressed the J inputs of all the flip-flops of the selector register exhibit a "false" level. When a key is depressed, predetermined switches associated with the selected keys are closed and the J inputs coupled to those particular switches assume a "true" level. The next pulse on the clock input of those flip-flops in which the J input is "true" will trigger those flip-flops to the Q state. Once the coded representation of a depressed key has been entered into the selector register a new code cannot be entered by the depression of another program key until the machine has finished processing the program routine represented by the previously selected key.

It will be noted in FIG. 3 that the clock inputs of each of the J–K flip-flops in the selector register are connected to the outputs of a NAND-gate 33 logically gating a "not-busy" signal ($\overline{BUSY}$) and a CLOCK signal. The CLOCK signal is generated by the associated computer at a predetermined rate. The "not-busy" signal ($\overline{BUSY}$) is also generated by the associated computer and has a true level whenever the computer is not processing a previously entered program. It insures that no clock pulse will be generated and, therefore, no new code will be stored in the selector register until the computer has completed the previously selected program routine.

In summary, the selector register 22 provides a means to store a unique binary code representing each selectable program key on the keyboard 21. The selector register has a provision to prevent the removal of a previously stored code until the computer has accepted the contents of the register and has completed the processing of the program routine that the previous code represented.

As illustrated in FIG. 1, the code generated by the keyboard is compared with the information read from a program card. The binary information contained on the program card 25 represents a plurality of program routines that are translatable by the card reader 23 into a chain of electrical pulses that serve to activate storage elements in the program memory 24. The card reader 23 in the preferred embodiment is designed to read an 80-column card 25 in which each column contains 10 rows, numbered 0 through 9, as shown in FIG. 2. Each program key on the keyboard is represented on the program card 25 by binary data contained in a group of contiguous columns on the cards. In the preferred system there are 20 keys represented on a program card, with each key denoting a field or sector of four contiguous columns of the card. As there 10 data positions to a row, one four-row sector of the card contains 40 positions capable of containing programming information.

The program card 25 used in conjunction with the card reader is composed of a transparent material such as plastic on which the data positions are blackened with a pencil or the like to indicate the desired information. Such a card permits an operator to erase the information contained on the card and to change it to accommodate varied program requirements. In a program card, as illustrated in FIG. 2, row five has data bits 34 contained in each card column to generate a strobe that is used for timing by other components of the system.

A card reader for cyclically reading such a program card is shown in FIG. 4. The transparent program card 25 is formed in a cylindrical shape and rotated about its axis past a stationary reading means such as photoelectric elements. Specifically, a photoelectric element 35 on one side of the rotating card and the light source 36 on the other are disposed coradially with respect to the axis of the cylinder and each element is aligned in a horizontal plane through each row of the card. Columnar mountings 37 serve to so dispose the photoelectric elements 35 and light sources 36. To maintain the card in the cylindrical configuration a cylindrical translucent plastic tube 38 abuts the flat side of a program card 25 inserted therein. One end of the tube 38 is open for insertion of a card and the other end of the tube is closed by a cap 39 that serves to define an upward axial limit for a card 25 inserted within the tube. A card-positioning ridge 40 projecting downwardly from the cap 39 within the tube 38 forms a narrow groove with the inside cylindrical periphery of the tube to position the upper portion of an inserted card. A card-retaining strap 41 fixedly mounted at its center on a post 42 projecting from the cylindrical wall of the tube 38 has studs 43 on either end for engagement with holes 44 in the lower portion of each of a program card. The retaining strap 41 and positioning ridge assist in correctly positioning the card in an abutting relationship with the inside surface of the tube. Projecting downwardly within the tube from the cap 39 is a hollow cylindrical drive connecting shaft 45 of substantially smaller diameter than the tube 38 and aligned coaxially therewith. The hollow interior of the drive-connecting shaft 45 connects with an end of a driven shaft 46 of common cross-sectional shape. When correctly inserted one flat side of the driven shaft 46 abuts a flat side of the hollow interior of the drive-connecting shaft 45 to provide torsional rigidity between the driven shaft and the rotatable tube 38. The lower end of the driven shaft 46 is coupled to an appropriate driving means such as an electric motor 47 for axial rotation of the connected tube 38 and card 25 past the photoelectric reading elements 35.

Figure 5:
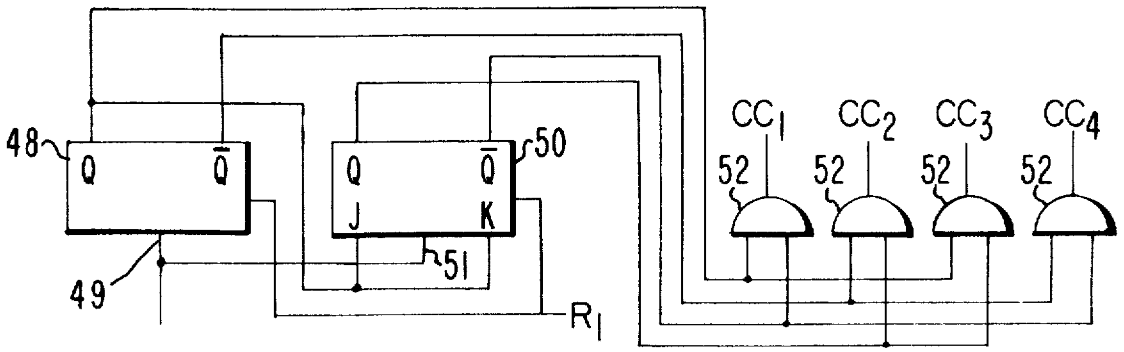
FIG. 5 is a schematic diagram of a four-state binary column counter.

A column binary counter 26 having four stable states, as illustrated in FIG. 5, is incremented through its four states by the strobe generated by the card reader 23. Each of the states of the counter 26 is coincident with the positioning a different program card data column adjacent the photoelectric reading element 35 of the card reader 23. Operationally, the column counter 26 is incremented for each column read from the card 25, from one to four. After the fourth column count, the counter is at its initial state. Then it counts the next four columns from one to four. With the type of programming card 25 used in the preferred system the column counter 26 recycles 20 times for each cyclic card read, counting 80 columns in groups of four.

The column counter, as shown, is a well-known electrical circuit commonly called a ripple counter having as its basic components a pair of complementing bistable circuits or flip-flops. The first flip-flop 48 has a clock input 49 electrically connected to the strobe from the card reader. At the trailing edge of each strobe pulse the first flip-flop 48 changes state. The second flip-flop 50 also has its clock input 51 coupled with the strobe from the card reader 23 and has its J and K inputs electrically connected with the Q output of the first flip-flop. The strobe at the clock input 51 of the second flip-flop changes its state only when the state of the coupled first flip-flop 48 is true. The Q and $\overline{Q}$ states of both flip-flops are gated by four AND-gates 52 to obtain waveforms representing all four of their permutable binary states, CC1, CC2, CC3, and CC4, as shown in the waveform diagrams of FIG. 6.

Figure 7:
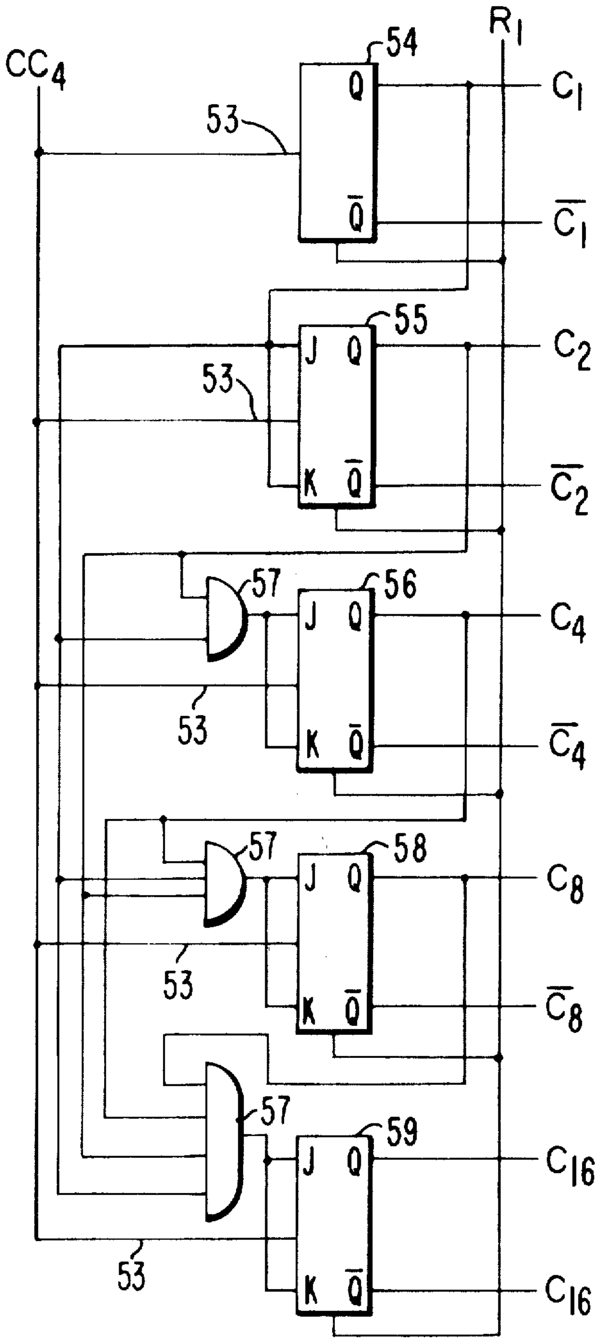
FIG. 7 is a schematic diagram of a 32-state binary sector counter.

The assignment of a unique code to each four-column sector of the program card 25 is accomplished by a sector binary counter 27 having five complementing bistable elements electrically connected in a second ripple counter. Each bistable element or flip-flop of the sector counter, as shown in FIG. 7 represents a consecutive power of the binary digit 2 or decimal quantities 1, 2, 4, 8 and 16, respectively. The code represented by the sector counter 27 is characterized by a permutation of the states of the flip-flops in the counter. As will be recalled the selector register stores a code corresponding to the key selected on the keyboard in five flip-flops coded in the same manner as those of the sector counter.

Each of the five flip-flops of the sector counter have their clock inputs 53 electrically coupled with the CC4 output of the column counter. The trailing edge of each CC4 pulse increments the binary number stored in the sector counter by a count of one. When the sector counter has been incremented twenty times, a reset pulse ($R_1$) generated by the card reader at the end of each cyclical card read resets the counter to zero. To reiterate, the code represented by the states of the flip-flops in the sector counter 27 represents that sector of the program card being read by the reader at any particular point in time.

Figure 8:
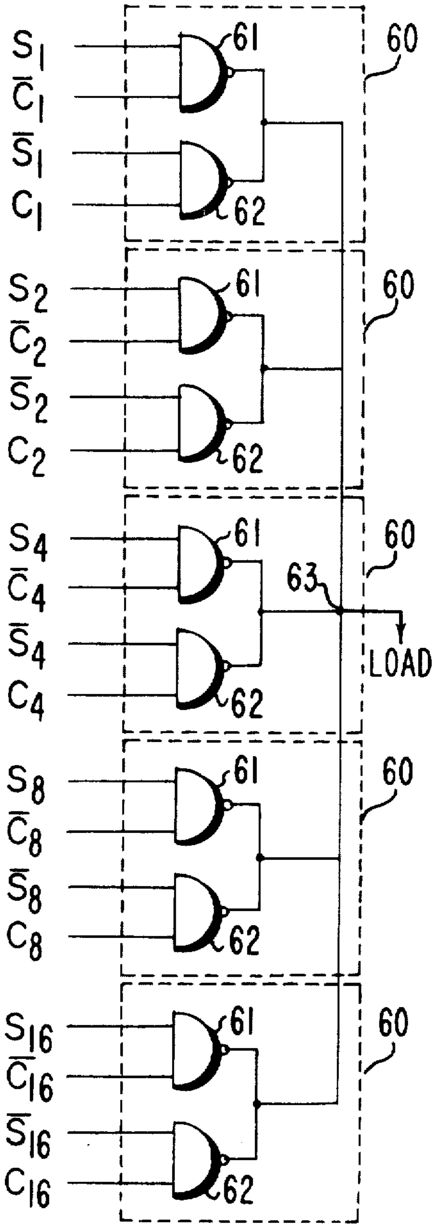
FIG. 8 is a schematic diagram of a comparator.

As heretofore explained the contents of the selector register 22 that stores the coded representation of a selected program key is compared in a comparator 28, such as illustrated in FIG. 8, with the binary code assigned to each four column sector of the program card 25 by the sector counter 27. The register 22 is comprised of 10 NAND-gates with a different two of the 10 each being connected to corresponding flip-flops of the selector register 22 and the sector counter 27. As illustrated, in each double-NAND-gate element 60 of the comparator the Q state of each flip-flop 30 in the selector 22 is logically switched in a first NAND-gate 61 with the $\overline{Q}$ state of its corresponding flip-flop in the sector counter 27. In a second NAND-gate 62 of each double-NAND-gate element 60 of the comparator the $\overline{Q}$ state of a selector register flip-flop is gated with the Q state of its corresponding flip-flop in the sector counter 27. The outputs of all the NAND-gates are connected at a common node 63. So connected a logical false or ground signal at the output of any on of the connected NAND-gates results in a ground at the common node 63. Likewise the states of the remaining four corresponding flip-flops are compared by the remaining four double-NAND-gate circuits and connected at the common node 63. Only when the contents of the selector register 22 and the sector counter 27 are identical will the common node 63 of the comparator display a high-electrical potential or a logical true signal labeled LOAD. In this manner the comparator monitors the contents of the selector register 22 and the sector counter 27, signaling with a high potential or LOAD signal when it detects that the contents of the sector counter and selector register are identical.

The LOAD signal from the comparator defines the precise time at which the card reader is responding to the programming information on the program card corresponding to the computer operation that an operator has selected by the depression of a program key. The computer may begin processing the selected operation after storing the related programming information read by the card reader in its program memory.

Figure 9:
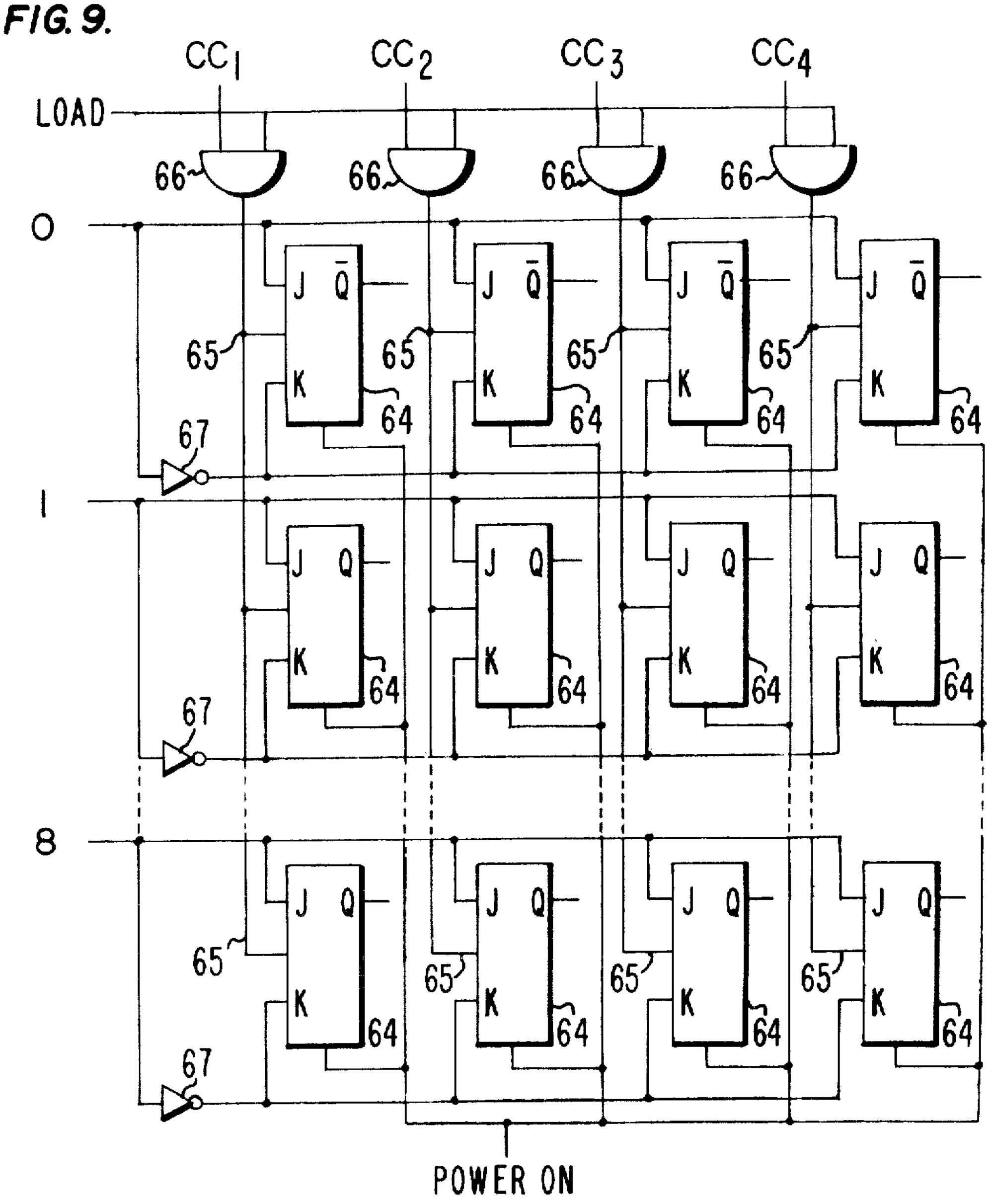
FIG. 9 is a schematic diagram of a flip-flop program memory of a variety that may be used in conjunction with the programming system.

Although the subject programming system could operate with several different types of computer memories, for the purposes of this description it will be connected with a flip-flop program register. The register, as illustrated in FIG. 9 is comprised of an array of flip-flops 64 having a configuration similar to that of the data positions on a sector of the program card 25. As there are four data columns in a sector of the program card, there are four columns of flip-flops 64 in the register. However, there are only nine rows of flip-flops in the program register instead of 10 as in a sector of a program card, the missing row being the fifth or strobing row on the program card 25. Each flip-flop 64 in the program register represents one machine instruction while collectively the flip-flops of the register define a repertoire of computer instructions.

The programming information read by the card reader is gated into the flip-flop register to trigger to the Q states those flip-flops 64 in the register corresponding to the blackened data positions on the selected sector of the program card 25. This is accomplished, as shown in FIG. 9, by connecting the clock input 65 of each flip-flop in the first column of the register with the output of an AND-gate 66 that logically "ANDs" and LOAD signal with the corresponding column count pulse from the column counter 26. The J inputs of the first row of flip-flops 64 in the register are electrically connected with the photoelectric element 35 of the card reader 23 that reads the first row of data on the program card 25. An inverter 67 connects the K input of each flip-flop in the register to its J input.

In a like manner each of the remaining rows of flip-flops in the register each have their J inputs electrically connected with the photoelectric element of the card reader that reads a corresponding row of the program card. A reset input of each flip-flop in the program memory is connected with a POWER-ON signal which clears the memory of all information when the computer is turned on.

OPERATION

For the purposes of illustration, assume that the programming system is incorporated in a small digital computer designed for use in a banking operation. The computer system has the capabilities, among others, of adding, subtracting, encoding MICR characters, and printing MICR characters. Further assume that a bank teller equipped with such a computer system is servicing a customer who wishes to deposit a check in his savings account. The customer presents the check and a deposit slip to the teller who positions the check in a print station of an MICR character printer coupled as an output device to the computer. The teller then enters the face value of the check on data keys of a keyboard and depresses a program key labeled "ADCR" on the program keyboard 21. As previously described the depression of the program key is encoded to a five place binary number and stored in the selector register shown in FIG. 3. It will be assumed that the program key labeled "ADCR" is encoded as a binary five.

Figure 6:
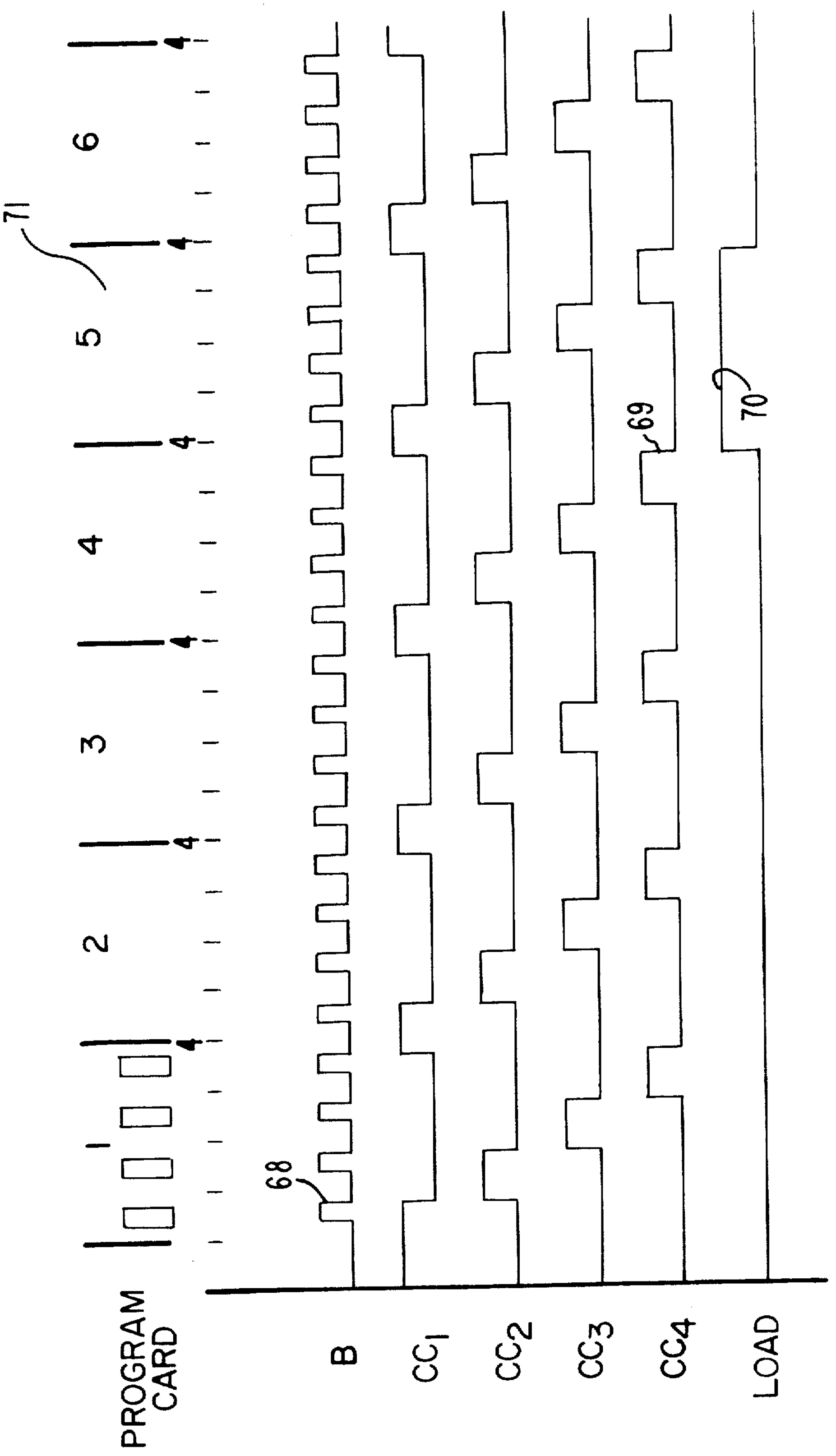
FIG. 6 is a timing diagram illustrating time relationships between various waveforms generated by the programming system in the course of its operation.

Meanwhile the card reader 23 is cyclically reading a program card 25 that contains in predetermined positions binary information representing a program routine corresponding to the "ADCR" key. In order to find the positions on the program card that corresponds with the "ADCR" program key a current and accurate record of the card's position in the reader must be maintained. This is accomplished by the column binary counter 26 shown in FIG. 5. As the card is being read a strobe B, as shown in FIG. 6 is generated each time a column position of the card passes through the read position of the card reader 23. The column binary counter 26 generates four pulse waveforms, CC1, CC2, CC3 and CC4. The CC1 waveform is characterized by a high potential during the intervening period between the end of one cyclic card read and the trailing edge of the first strobing pulse 68 of the next reading cycle of the program card 25. Thereafter, during each reading cycle the CC1 pulse occurs every fourth strobe pulse for a duration equal to the length of time between trailing edges of two succeeding strobe pulses. Each of the pulses from the column counter are of substantially equal duration with the leading edges of the CC2 pulses being coincident with the trailing edges of the CC1 pulses, the leading edges of the CC3 pulses being coincident with the trailing edges of the CC2 pulses, and so forth.

The column counter's CC4 pulse marks the end of each four-column sector of the program card and the beginning of the next consecutive one. As hereinbefore stated, each program or program routine represented by a program key on the keyboard is contained in a four consecutive column sector of the program card 25. Utilizing the CC4 pulse as a signal for the beginning of each sector on the program card the sector counter assigns a binary number to each four-column sector. At the trailing edge of the CC4 pulse 69 for the fourth sector of the program card 25 the sector counter 27 assigns or generates a binary number 5.

The comparator 28, recognizing the identity of the binary number stored in the selector register 22 by the depression of the "ADCR" key and the binary number assigned by the sector counter 27, generates a LOAD signal 70. The data being read by the program card reader 23 for the duration the LOAD signal is switched into the flip-flop program register as described above.

As shown in FIG. 2 the data in the fifth sector 71 of the program card 25 consists of three binary bits. Each of those bits serves to activate a flip-flop in the program register and each activated flip.flop in turn initiates a distinct computer operation or instruction. The depression of the "ADCR" key, it can be seen, programs the computer with a three-instruction routine. In the example set forth the computer would ADD the face value of the check to a predetermined register, ENCODE the face value in MICR notation and PRINT the face value in MICR characters on the check.

It is apparent that much more complex programs could be initiated by a programming system such as described depending upon the capabilities of the computer in which the system would be incorporated. The sectors of the card or medium represented by a selecting means, such as a key, could be as large as the complexity of the associated computer allows or as small as the programming requirements permit. Various types of program mediums and medium cyclical readers could be used to accomplish the same functions as the transparent program card and cyclical card reader described in the preferred embodiment. Many other modifications could be made to the system described without truly departing from the scope of the inventive combination disclosed herein.

What is claimed is:

1. A system for selecting and entering a program into the memory of a digital computer comprising:

means for selecting one of a plurality of codes, each code representing a unique program for the digital computer, means for cyclically reading from a medium containing information representing a plurality of programs, means electrically coupled with said reading means for assigning a unique one of a plurality of codes to each program read by said reading means, said assigned codes bearing a predetermined relationship to those selectable by said selecting means, and comparing means electrically coupling said selecting means and said assigning means for generating an electrical signal when the code selected by said selecting means and the code assigned by said assigning means attain a predetermined corresponding relationship, whereby said electrical signal is employable to enable the program read by said reading means and represented by said selected code to be entered into the memory of the computer.

2. A system for selecting and entering a program into the memory of a digital computer as defined in claim 1 wherein said cyclical reading means is a card reader for reading from a card binary information representing a predetermined plurality of program routines.

3. A system for selecting and entering a program into the memory of a digital computer as defined in claim 2 wherein said card reader comprises a rotatable retaining assembly for supporting a card in a semicylindrical configuration, a light source disposed adjacent to one side of said card, and a plurality of photoelectric elements for electrically responding to light passing through said card, said elements disposed coradially with said light source and on the opposite side of said card therefrom.

4. A system for selecting and entering a program into the memory of a digital computer as defined in claim 1 wherein said code-selecting means is a binary encoding keyboard having a plurality of depressable program keys each representing a distinct program routine.

5. In a digital computer a system for selecting and entering a program into computer memory comprising:

means for selecting one of a plurality of codes, each code representing a unique computer program.

electronic means for cyclically reading binary information from a medium, said information being arranged in sectors with each sector containing binary information representing a unique program, means electrically coupled with said electronic reading means for assigning a unique code to each of said sectors of said medium, the assigned codes bearing a predetermined relationship to those selectable by said selecting means, comparing means electrically coupling said selecting means and said assigning means for generating an electrical signal when the code selected by said selecting means and the code assigned by said assigning means attain a predetermined corresponding relationship, and switching means electrically coupled with said electronic reading means and responsive to the electrical signal from said comparing means to discriminately enter into computer memory the sector of binary information from said medium represented by the code selected from said selecting means.

6. In a digital computer a system for entering a program into computer memory comprising:

means for selecting one of a plurality of codes, each code representing a unique one of a plurality of programs, storage means electrically coupled with said selecting means for storing the code selected by said selecting means, electronic means for cyclically reading a medium containing sectors of binary information each representing a predetermined program, means electrically coupled with said electronic reading means for assigning a unique code to each of said reading means, the assigned codes bearing a predetermined relationship to those selectable by said selecting means, comparing means electrically coupling said storage means and said assigning means for generating an electrical signal when the code stored in said storage means and the code assigned by said assigning means attain a predetermined corresponding relationship, and switching means electrically coupled with said electronic reading means and responsive to the electrical signal from said comparing means to discriminately enter into computer memory the sector of binary information from said medium represented by the code stored in said storage means.

7. A system for entering a program into computer memory as defined in claim 6 wherein said storage means is a register having storage elements comprised of a predetermined plurality of complementing bistable circuits.

8. A system for selecting and entering a program into the memory of a digital computer comprising:

a keyboard having a plurality of depressable program keys, upon the depression of any one of thereof, for generating a unique electrical code denoting a program, a register electrically connected with said keyboard for storing the electrical code generated by said keyboard, a card reader operable to electronically and cyclically read a program card, said card including sectors of binary information each representing a program, a binary counter electrically connected with said card reader for assigning a unique electrical code to each sector of binary information read by said card reader, said assignable codes being equivalent to said keyboard selectable codes, and an electronic comparator electrically connected with said register and said binary counter and operable to generate an electrical signal when the selected code stored in said register is identical to the code assigned by said counter, whereby said electrical signal is employable to enable the program read by said reading means and denoted by said selected code to be entered into the memory of the computer.

9. A system for selecting and entering a program into the memory of a digital computer as defined in claim 8 further including, electronic gating means switchably connecting said card reader and said comparator and responsive to the electric signal from said comparator for discriminately entering into computer means the program denoted by said keyboard.

10. In a digital computer a system for selecting and entering a program into computer memory comprising:

a keyboard having a plurality of depressible program keys, upon the depression of any one thereof, for generating a unique electrical code denoting a program, a register electrically connected with said keyboard for storing the electrical code generated by said keyboard, a program card containing a plurality of sectors each compressed of an equal predetermined number of consecutive columns of binary data, representing a computer program, an electronic card reader coupled with said program card for cyclically generating chains of electrical pulses representative of the binary data contained on said program card, a column binary counter electrically coupled with said card reader for generating a first electrical signal at the end of each of said sectors of consecutive columns of binary data being read by said card reader, a sector binary counter electrically coupled with said column binary counter for generating a unique electrical code when signaled by said column binary counter, each of said unique electrical codes being equivalent to a corresponding electrical code selectable from said keyboard, an electronic comparator electrically coupled with said register and said sector binary counter for generating a second electric signal when the selected code stored in said register is identical to the code generated by said sector binary counter, and electronic gating means switchably connecting said card reader and said comparator and responsive to said second electric signal from said comparator for discriminately entering into computer memory the program denoted by said selected key.

11. In a digital computer having a program memory including a plurality of bistable storage elements each representing a machine instruction of the computer's repertoire, a programming system comprising:

means for selecting and generating one of a predetermined plurality of electrical binary codes, a storage means electrically coupled with said selecting means for storing the binary code generated by said selecting means, a program medium containing a plurality of sectors each similarly comprised of a predetermined array of data positions, each position being representative of a machine instruction of the computer's repertoire, cyclical reading means coupled with said program medium for electrically responding to the data contained on said medium, assigning means electrically coupled with said cyclical reading means for generating a unique electrical binary code each time said reading means responds to a different sector of said program medium, each of said binary codes generated by said assigning means being equivalent to a corresponding one of said plurality of binary codes generated by said selecting means, comparing means electrically coupled with said assigning means and said storage means for generating an electrical signal when the code stored in said storage means and the code generated by said assigning means are identical, and switching means electrically coupling said comparing means, said cyclical reading means and the program memory of said digital computer for discriminately activating those bistable storage elements of said computer memory represented by the data contained in the sector of said program medium corresponding to the code generated by said selecting means.

12. A system as defined in claim 11 wherein said program medium is a card composed of transparent material.

13. A system as defined in claim 12 wherein the data positions of the sectors of said program card are arranged in consecutive columns.

14. A system as defined in claim 11 wherein said assigning means is comprised of a column binary counter having a number of stable states equal to the number of consecutive columns of data positions in a sector of said program medium, the occurrence of each state of said column binary counter being coincident with the reading of a different column of said sector, and a sector binary counter responsive to the stable state of said column binary counter coincident with the last column of each sector of data read by said reading means for generating unique electrical binary code representative of the sector of said medium being read by said reading means, said unique electrical binary code being identical to one of the codes selectable from said selecting means.

* * * * *

PO-1050
(5/69)

UNITED STATES PATENT OFFICE
CERTIFICATE OF CORRECTION

Patent No. 3,636,521 Dated January 18, 1972

Inventor(s) Harry L. Wallace and Richard M. Williams

It is certified that error appears in the above-identified patent and that said Letters Patent are hereby corrected as shown below:

Col. 2, line 49, change "card counter 27" to --card sector counter 27--.

Col. 3, line 4, change "J-flip flops" to --J-K flip flops--.
line 59, change "there 10 data" to --there are 10 data--.

Col. 4, line 19, change "each of a" to --each end of a--.

Col. 5, line 29, change "of any on" to --of any one--.
line 71, after "ANDs" insert --the CC1 pulse from the column counter and the LOAD signal. The second, third and fourth columns of the register have their clock inputs 65 each similarly connected with the output of an AND gate that logically "ANDs"--.

Col. 9, lines 6 and 7, change "each compressed" to --each comprised--.

Signed and sealed this 6th day of June 1972.

(SEAL)
Attest:

EDWARD M. FLETCHER, JR.
Attesting Officer

ROBERT GOTTSCHALK
Commissioner of Patents